United States Patent
Winkler et al.

(10) Patent No.: US 6,500,402 B1
(45) Date of Patent: Dec. 31, 2002

(54) CATALYST FOR OXIDIZING $SO_2$ TO $SO_3$ AND UTILIZATION OF THE CATALYST IN A METHOD FOR PRODUCING SULFURIC ACID

(75) Inventors: Egon Winkler, Flörsheim (DE); Georg Schmidt, Frankfurt am Main (DE); Achim Hollnagel, Frankfurt am Main (DE); Dietrich Werner, Messel (DE); Nikola Anastasijevic, Altenstadt (DE); Franz-Ferdinand Schüth, Oberursel (DE); Anette Wingen, Frankfurt am Main (DE)

(73) Assignee: Metallgesellschaft Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/600,332

(22) PCT Filed: Dec. 17, 1998

(86) PCT No.: PCT/EP98/08310

§ 371 (c)(1),
(2), (4) Date: Oct. 12, 2000

(87) PCT Pub. No.: WO99/36175

PCT Pub. Date: Jul. 22, 1999

(30) Foreign Application Priority Data

Jan. 13, 1998 (DE) .......................................... 198 00 800

(51) Int. Cl.[7] .............................................. C01B 17/69
(52) U.S. Cl. ...................... 423/522; 423/532; 423/533; 423/534; 423/535; 423/538
(58) Field of Search ................................ 423/522, 532, 423/533, 534, 535, 538; 502/87, 338

(56) References Cited

U.S. PATENT DOCUMENTS

| | | | | |
|---|---|---|---|---|
| 3,759,825 A | * | 9/1973 | Chun et al. | 208/191 |
| 3,933,991 A | * | 1/1976 | Dorn et al. | 423/535 |
| 4,158,048 A | * | 6/1979 | Leclercq | 423/533 |
| 4,244,937 A | * | 1/1981 | Durkin | 423/522 |
| 4,539,309 A | * | 9/1985 | Meisser et al. | 502/247 |
| 5,108,976 A | * | 4/1992 | Cavalli et al. | 502/247 |

FOREIGN PATENT DOCUMENTS

| | | | |
|---|---|---|---|
| EP | 0325214 | * | 7/1989 |
| EP | 0409353 | * | 1/1991 |
| GB | 2213580 | * | 6/1973 |
| WO | 9732815 | * | 9/1997 |

OTHER PUBLICATIONS

Elvers et al. "Ullmann's Encyclopedia of Industrial Chemistry" (5th ed.) vol. A25, ISBN 3-527-20125-4, VCH Verlagsgesellschaft, Fed. Rep. of Germany, 1994 pp. 644-664.*

* cited by examiner

Primary Examiner—Stanley S. Silverman
Assistant Examiner—Timothy C Vanoy
(74) Attorney, Agent, or Firm—Herbert Dubno; Jonathan Myers

(57) ABSTRACT

A catalyst for reacting $SO_2$ with molecular oxygen to form $SO_3$ is suited for a continuous operation at temperatures of 700° C. and above, when the same consists of a carrier and an active component connected with the carrier, the active component consists of 10 to 80 wt-% iron, the carrier has a BET surface of 100 to 2000 m²/g and an $SiO_2$ content of at least 90 wt-%, and the weight ratio carrier:active component is 1:1 to 100:1.

19 Claims, 1 Drawing Sheet

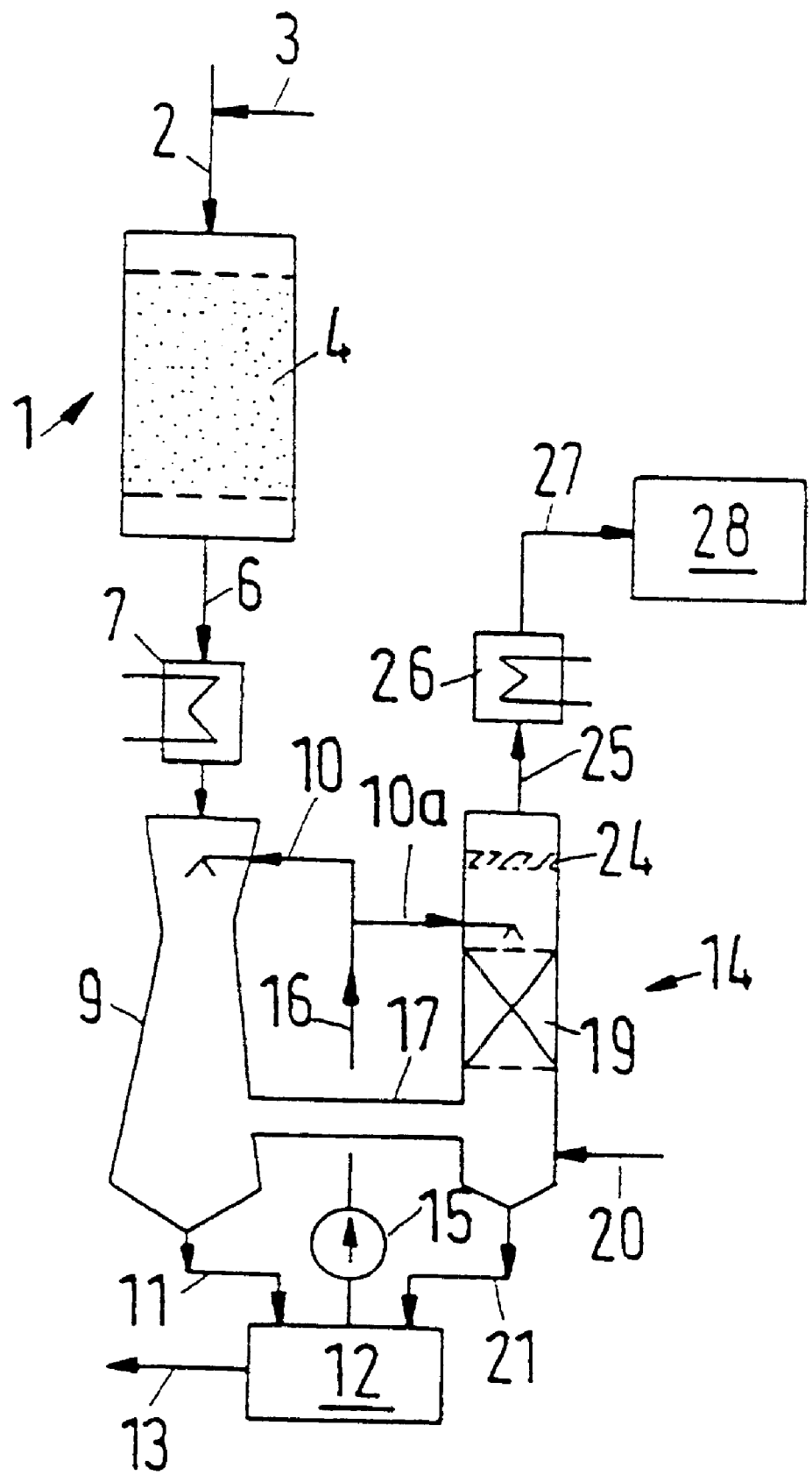

CATALYST FOR OXIDIZING $SO_2$ TO $SO_3$ AND UTILIZATION OF THE CATALYST IN A METHOD FOR PRODUCING SULFURIC ACID

CROSS REFERENCE TO RELATED APPLICATIONS

This application is the U.S. National Phase of PCT/EP98/08310 filed Dec. 17, 1998.

FIELD OF THE INVENTION

This invention relates to a catalyst for reacting $SO_2$ with molecular oxygen to form $SO_3$, and also to a process of producing sulfuric acid from $SO_3$ and water, where the $SO_3$ is produced catalytically by reacting $SO_2$ with molecular oxygen.

BACKGROUND OF THE INVENTION

The production of sulfuric acid from $SO_2$, which first of all is catalytically oxidized to form $SO_3$, is described in detail in Ullmann's Encyclopedia of Industrial Chemistry, 5th edition, vol. A25, pages 644 to 664. The known catalysts for the oxidation of $SO_2$, which contain for instance $V_2O_5$ as active component, preferably operate at a temperature in the range from 380 to 620° C. Higher temperatures will damage the catalyst. This leads to the fact that the gas supplied to the catalysis should have an $SO_2$ content of not more than about 12 vol-%, so that the exothermicity of the oxidation reaction can easily be controlled. The DE-C-27 10 350 describes a catalyst for the conversion of $SO_2$ into $SO_3$, which operates at a temperature in the range from 600 to 800° C. The catalyst has a silicon oxide carrier with a tridymite structure and an active component containing iron, copper and an alkali metal.

OBJECT OF THE INVENTION

It is the object underlying the invention to create a catalyst suitable for continuous operation, whose activity and stability are also ensured at temperatures of 700° C. and above. Furthermore, the catalyst should form the basis for a process of producing sulfuric acid, where gases with a high concentration of $SO_2$ are used.

SUMMARY OF THE INVENTION

In accordance with the invention, the catalyst comprises a porous carrier and an active component connected with the carrier, where the active component consists of 10 to 80 wt-% iron, the carrier has a BET surface of 100 to 2000 m²/g and an $SiO_2$ content of at least 90 wt-%, and the weight ratio carrier:active component lies in the range from 1:1 to 100:1. As carrier materials there may be used silicates, in particular zeolites (e.g. zeolites of the beta type), mesoporous silica gels (e.g. zeolites of the beta type), mesoporous silica gels (e.g. synthesized in accordance with U.S. Pat. No. 3,556,725 or MCM-41 of Mobil Oil as pure $SiO_2$ material), also those mesoporous silica gels with up to 10 wt-% foreign elements (e.g. boron), diatomaceous earth, amorphous $SiO_2$ or mesoporous alumosilicate (e.g. aluminum-containing MCM-41 of Mobile Oil). Advantageous carriers comprise for instance 90 to 100 wt-% of a zeolite or mesoporous $SIO_2$. Details concerning the mesoporous $SiO_2$ can also be found in WO-A-91/11390 and in "Microporous Materials" 10 (1997), pages 283–286.

The iron-containing active component of the catalyst may in particular consist of at least 80 wt-% iron oxides. The active component may in addition contain sodium, potassium and/or cesium. The content of these alkali metals may be up to 10 wt-%, based on the total weight of the catalyst.

The active component of the catalyst may furthermore include vanadium and/or sulfur compounds (e.g. pyrosulfate). In the active component, the weight ratio V:Fe may lie in the range from 1:1 to 1.3:1. For the sulfate content in the catalyst, 1 to 7 wt-% are recommended, based on the total weight of the catalyst. When the active component of the catalyst also contains copper, the Cu content will be up to 1 wt-% of the Fe content.

In the laboratory, the following catalysts were prepared:

First Catalyst

As starting material, there was used a mesoporous $SiO_2$ with an ordered pore structure, with amorphous walls and a pore system with a regular hexagonal array with pore sizes between 2 and 8 nm (synthesized in accordance with WO-A-91/11390). It has a good thermal stability up to 1000° C. and a BET surface of about 1000 m²/g. To 10 g of an aqueous 25% $C_{16}H_{33}N(CH_3)_3Cl$ solution a mixture of 1.8 g soda waterglass (composition: 27.5 wt-% $SiO_2$, 8.3 wt-% $Na_2O$, plus water), 1.3 g $SiO_2$ and 10 g water was added within 15 minutes. After stirring for 30 minutes, the suspension was heated for 48 hours in a screwed polypropylene vessel to a temperature of 90° C. Then, it was filtrated, washed and dried for 8 hours at 90° C. The dried mixture was heated to 550° C. with a heating rate of 1° C. per minute and maintained at this temperature for 5 hours. 1 g of this product was thoroughly mixed with 3.5 ml of a 0.95 mol $Fe(NO_3)$ solution and subsequently dried for 2.5 hours a 90° C. The product was stirred for one hour in 25 g distilled water, filtrated, dried at 90° C. and then thermally treated as follows: heating to 400° C. with a rise of 5° C. per minute, maintaining at 400° C. for 3 hours, then heating to 700° C. with a rise of 5° C. per minute, and subsequently maintaining at this temperature for 3 hours. The product had a BET surface of 478 m²/g, the weight ratio Si:Fe was 5:1.

Second Catalyst 3 g commercial $SiO_2$ (BASF D11-10) were added to a solution of 0.18 g $NH_4VO_3$ in 20 ml water. Then, 0.62 g $FE(NO_3)_3 \cdot 9H_2O$, dissolved in 1 g water, were added dropwise by stirring quickly. The product was filtrated, washed, dried, heated to 800° C. and maintained at 800° C. for 24 hours. The weight ratio Si:Fe:V is 33:1:1.3. In the same way, iron vanadate can be applied onto carriers with a large surface.

Third Catalyst

Here, a zeolite-like iron silicate (structural type beta-zeolite) is used as carrier material; the iron silicate has a three-dimensional system of micropores and has a large BET surface of 600 m²/g. A first aqueous solution was prepared as follows: 78.5 g 40% tetraethylammonium hydroxide and 10.7 g 40% hydrogen fluoride were added to 260.4 g tetraethyl orthosilicate in a polypropylene vessel. 70% of this solution were separate, and to the remaining 30% of the first solution 3.6 g $FeCl_3$, dissolved in 9 g water, were added by stirring. Finally, there were added 22.2 g $NH_4F$ to the previously separated solution. The preparation was heated for 24 hours at 70° C. in the open vessel, and the dry gel was subsequently dissolved in 10 g water. Upon inoculation with nuclei (beta-zeolite, 5 wt-%) the product crystallized in the course of 15 days in the polytetrafluoro-ethylene vessel at 170° C. The product was heated to 200° C. of 2° per minute, maintained at this temperature for 3 hours, then heated to 550° C. of 5° C. per minute, and maintained at this temperature for 10 hours. The elemental analysis of the product revealed an atomic composition of H:Si:Fe:O:F=104:60:4.3:178:0.4.

Samples of the three catalysts described above were tested in the laboratory, so as to determine their activity with respect to the oxidation of $SO_2$ to form $SO_3$. Of each catalyst, 0.5 ml of a fraction with particle sizes between 500 to 1000 μm were maintained in the nitrogen stream for three hours at 324° C. for activation purposes. For measuring the activity, 24.7 ml/min of a gas consisting of 20 vol-% $SO_2$, 22 vol-% $O_2$, and 58 vol-% $N_2$ were passed over the activated catalyst samples, where a dwell time of 1.2 s in the catalyst bed was obtained. The activity (percentage of the converted $SO_2$) in dependence on the temperature is indicated in the following Table.

| Temperature | 1st catalyst | 2nd catalyst | 3rd catalyst |
| --- | --- | --- | --- |
| 500° C. | 46% | 18% | 44% |
| 550° C. | 58% | 29% | 62% |
| 600° C. | 72% | 43% | 77% |
| 650° C. | 65% | 55% | 65% |
| 700° C. | 51% | 51% | 51% |

The catalysts in accordance with the invention are particularly suited as precontact, so as to partly convert a gas with a high content of $SO_2$ into $SO_3$ and produce sulfuric acid, before the residual gas with a reduced content of $SO_2$ can be passed for instance into a conventional production of sulfuric acid. The gas containing $SO_2$ and $O_2$ with an $SO_2$ content of 13 to 50 vol-% and an oxygen content corresponding to $O_2/SO_2$ volume ratio of at least 1:2 is supplied to a precontact stage, in the precontact stage the gas and the oxygen are passed through at least one bed (precontact bed) of a granular catalyst (precontact), where the precontact has the features described above, and the maximum temperature at the precontact is maintained in the range from 580 to 800°°C. In the precontact stage 20 to 80% of the supplied $SO_2$ are converted to $SO_3$, and from the precontact stage a first gas mixture containing $SO_3$ is withdrawn, which is cooled to temperatures of 50 to 300° C. andis passed into at least one absorber, where in the absorber the first gas mixture is brought in direct contact with circulating sulfuric acid containing water, and a partial stream of sulfuric acid is withdrawn. From the absorber, a second gas mixture containing $SO_2$ is withdrawn, is heated to a temperature of 380 to 600° C. and with an $SO_2$ concentration of 10 to 30 vol-% is introduced into a subsequent oxidation stage, in which $SO_2$ is catalytically reacted with oxygen at temperatures of 480 to 770° C. to form $SO_3$. In further process steps, the $SO_3$ produced in the oxidation stage is processed to obtain sulfuric acid. In the subsequent oxidation stage, usual catalysts are used. These catalysts may have active components, which for instance consist of at least 5 wt-% $V_2O_5$.

The precontact stage may for instance have at least two pre-contact beds, through which the gas flows one after the other. Expediently, the gas containing $SO_2$, $O_2$ and $SO_3$ is cooled between the precontact beds to temperatures of not more than 550° C. From the last precontact bed a gas is withdrawn after an intermediate absorption with preferably not more than 13 vol-% $SO_2$ and is introduced into a subsequent oxidation stage.

BRIEF DESCRIPTION OF THE DRAWING

A flow diagram of the process will now be explained with reference to the drawing.

DETAILED DESCRIPTION OF THE DRAWING

A gas rich in $SO_2$, to which $O_2$-containing gas (e.g. air) has been admixed through line 3, is supplied to the precontact stage 1 through line 2. The $SO_2$ content of the gas in line 2 lies in the range from 13 to 50 vol-% and mostly at least 15 vol-%, and the gas has preferably been preheated to temperatures of 350 to 500° C. In the process variant represented in the drawing, the precontact stage 1 consists of the fixed bed 4 of the temperature-resistant catalyst, which here is referred to as precontact; the bed is referred to as precontact bed 4. It may be expedient to provide at the entrance of the bed 4 a conventional catalyst (e.g. vanadium contact) in a thin layer as a so-called ignition layer, in order to sufficiently increase the temperature in the gas, so that the oxidation reaction in the bed of the precontact will fully start immediately.

At the entrance of the precontact bed 4 an $O_2/SO_2$ volume ratio of at least 0.5:1 is ensured. At the precontact, a rise in temperature is effected by the oxidation reactions during the formation of $SO_3$. A first $SO_3$-containing gas mixture leaves the precontact stage 1 via line 6 with temperatures in the range from 580 to 800° C. and preferably 600 to 700° C. This first gas mixture is cooled in the waste heat boiler 7 to temperatures of 50 to 300° C., where a valuable high-pressure steam may be recovered from water. The gas mixture then enters a first absorber 9, which is designed like a Venturi scrubber. Sulfuric acid coming from line 10 is sprayed into the gas, where the concentration of the sulfuric acid is increased by the absorption of $SO_3$. The sulfuric acid formed in the first absorber 9 flows through line 11 to a collecting tank 12, excess sulfuric acid, whose concentration usually lies in the range from 95 to 100 wt-%, is withdrawn via line 13.

From the collecting tank 12, through the circulating pump 15 and line 16, sulfuric acid is supplied to the first absorber 9 and also to a second absorber 14, which is connected with the first absorber by the passage 17. $SO_3$-containing gas flows through the passage 17 to the second absorber 14 and there upwards through a layer 19 of contact elements, which is sprayed with sulfuric acid from line 10a. Water is supplied via line 20, and the sulfuric acid discharged via line 21 likewise flows into the collecting tank 12. In practice, the absorbers 9 and 14 may also be designed differently than represented in the drawing.

The gas flowing upwards in the second absorber 14 releases sulfuric acid droplets in the droplet separator 24, and then flows through line 25 to a heater 26, which raises the temperature of the gas to 380 to 500° C. The gas in line 27, here also referred to as second gas mixture, has an $SO_2$ concentration of 10 to 30 vol-%. Due to this relatively low $SO_2$ concentration, it may be supplied to a conventional sulfuric acid plant 28, which employs the usual catalysts for oxidizing $SO_2$ to form $SO_3$. The mode of operation and the structure of such a conventional plant is known and described for instance in Ullmann's Encyclopedia of Industrial Chemistry, as mentioned above.

EXAMPLE

In the laboratory, the above-described first catalyst is used for partly converting a gas mixture with the components indicated in column A of the subsequent Table to form $SO_3$:

| | A | B | C | D |
| --- | --- | --- | --- | --- |
| $SO_2$ (vol-%) | 30 | 21.1 | 11.1 | 14.3 |
| $SO_3$ (vol-%) | — | 10.5 | 22.2 | — |
| $O_2$ (vol-%) | 33 | 29.5 | 25.6 | 32.9 |
| $N_2$ (vol-%) | 37 | 38.9 | 41.1 | 52.8 |

The data of the example have been calculated in part. The catalyst (precontact) has been formed into cylindrical extrudates of about 8 mm in height and 6 mm in diameter. The catalyst is distributed over two trays (precontact beds) through which flows the gas mixture one after the other, each tray contains 40 g catalyst with a bed height of 8 cm, the tray diameter is 4.7 cm. On the gas inlet side, each tray has a commercial vanadium catalyst for increasing the temperature ("ignition layer"), so that the desired oxidation takes place at the precontact. The height of the ignition layer is 1 cm. 100 1/h of the gas mixture of column A of the above Table enter the ignition layer of the first tray with a temperature of 420° C. and the precontact bed with a temperature of 550° C. A gas mixture with the composition indicated in column B of the above Table leaves the first tray with a temperature of 670° C. and is cooled to 420° C. by an indirect heat exchange. The cooled gas mixture is passed through the second tray, which like the first tray contains an ignition layer and a bed of the precontact. At the outlet of the second tray, the gas mixture has a temperature of 670° C. and the composition indicated in column C of the above Table. When this gas mixture is cooled and the $SO_3$ is removed through absorption by means of sulfuric acid, as described in conjunction with the drawing, there is obtained a gas mixture with the composition indicated in column D of the above Table. In accordance with the modern prior art (e.g. Lurgi, Frankfurt), this gas mixture with an $SO_2$ content of 1.3 vol-% may be processed in a main converter, where $SO_3$ and sulfuric acid are formed and a tail gas with an $SO_2$ content of less than 200 ppm is left.

What is claimed is:

1. Use of a catalyst consisting essentially of a porous carrier and an active component connected with the carrier, wherein the active component consists essentially of 10 to 80 weight % iron, the carrier has a BET surface of 100 to 2000 $m^2/g$, and an $SiO_2$ content of at least 90 weight %, and the weight ratio carrier:active component lies in the range from 1:1 to 100:1, for the reaction of a gas with an $SO_2$ content of 13 to 50 vol % with molecular oxygen to form $SO_3$.

2. The use of the catalyst defined in claim 1 wherein the active component of the catalyst consists of at least 80 weight % iron oxides.

3. The use of the catalyst defined in claim 1 wherein the catalyst carrier consists of 90 to 100 weight % zeolite.

4. The use of the catalyst defined in claim 1 wherein the catalyst carrier consists of 90 to 100 weight % mesoporous silica.

5. The use of the catalyst defined in claim 1 wherein the catalyst is selected from the group consisting of iron oxide on mesoporous silica having a weight ratio of Si:Fe of 5:1, iron vanadate on silica having a weight ratio of Si:Fe:V of 33:1:1.3, and iron silicate on zeolite having a weight ratio of H:Si:Fe:O:F of 104:60:4.3:178:0.4.

6. A process of producing sulfuric acid from $SO_3$ and water, where the $SO_3$ is produced catalytically by reacting $SO_2$ with molecular oxygen, wherein a gas containing $SO_2$ and $O_2$ with an $SO_2$ content of 13 to 50 vol % and an oxygen content corresponding to an $O_2/SO_2$ volume ratio of at least 1:2 is supplied to a precontact stage, that in the precontact stage the gas and the oxygen are passed through at least one precontact bed of a precontact granular catalyst, that the precontact catalyst consists of a porous carrier and an active component connected with the carrier, where the carrier has a BET surface of 100 to 2000 $m^2/g$ and an $SiO_2$ content of at least 90 weight %, the active component consists of 10 to 80 weight % iron, and the weight ratio carrier: active component lies in the range from 1:1 to 100:1, that the maximum temperature at the precontact stage is 580 to 800° C., that in the precontact stage 20 to 80% of the supplied $SO_2$ is converted to $SO_3$, and from the precontact stage there is withdrawn a first gas mixture containing $SO_3$, which gas mixture is cooled to temperatures of 50 to 300° C. and introduced into at least one absorber, that in the absorber the first gas mixture is brought in direct contact with circulating sulfuric acid containing water, and a partial stream of sulfuric acid is withdrawn, that a second gas mixture containing $SO_2$ is withdrawn from the absorber and heated to a temperature from 380 to 600° C., that the second gas mixture with an $SO_2$ concentration of 10 to 30 vol % is introduced into a subsequent oxidation stage, in which $SO_2$ is catalytically reacted with oxygen at temperatures of 480 to 770° C. to form $SO_3$, and that the $SO_3$ formed in the oxidation stage is processed in further process steps to form sulfuric acid.

7. The process as defined in claim 6, wherein in the precontact stage the gas containing $SO_2$ and $O_2$ is passed through at least two precontact beds, where the gas is cooled between the beds to a temperature of not more than 550° C., and that after an intermediate absorption of $SO_3$ the gas having an $SO_2$ content of not more than 13 vol % is introduced as the second gas mixture into the subsequent oxidation stage.

8. The process as defined in claim 6, wherein in the subsequent oxidation stage a catalyst is used whose active component is based on vanadium in an amount of at least 5 weight %.

9. The process as defined in claim 6 wherein the precontact catalyst is selected from the group consisting of iron oxide on mesoporous silica having a weight ratio of Si:Fe of 5:1, iron vanadate on silica having a weight ratio of Si:Fe:V of 33:1:1.3, and iron silicate on zeolite having a weight ratio of H:Si:Fe:O:F of 104:60:4.3:178:0.4.

10. A process for producing sulfuric acid which comprises the steps of:

(a) supplying a gas preheated to a temperature of 350 to 500° C. containing $SO_2$ and $O_2$ with an $SO_2$ content of 15 to 50 vol-% and an $O_2$ content corresponding to an $O_2/SO_2$ volume ratio of at least 1:2;

(b) passing the gas to a precontact stage through at least one precontact catalyst bed containing a granular precontact catalyst comprising an active component consisting essentially of 10 to 80 weight-% of iron and a porous carrier comprising at least 90 weight-% of $SiO_2$, wherein the porous carrier has a BET surface of 100 to 2000 $m^2/g$, and the weight ratio of the porous carrier to the active component lies in the range of 1:1 to 100:1 to oxidize 20 to 80% of the $SO_2$ in the gas to $SO_3$ at a temperature of 580 to 800° C.;

(c) withdrawing from the precontact stage a first gas mixture containing $SO_3$ and $SO_2$ and cooling the first gas mixture containing $SO_3$ and $SO_2$ to a temperature of 50 to 300° C.;

(d) directly contacting the cooled first gas mixture containing $SO_3$ and $SO_2$ with circulating sulfuric acid and water in a first absorption stage in the form of a venturi scrubber to absorb the $SO_3$, thereby forming a first stream of sulfuric acid of an increased concentration by absorption of $SO_3$, and withdrawing the first stream of sulfuric acid of increased concentration from the first absorption stage;

(e) channeling the cooled first gas mixture containing remaining $SO_3$ directly from the first absorption stage to a second absorption stage, said cooled first gas mixture flowing upwardly through said second absorption stage through a layer of contact elements and in contact with circulating sulfuric acid and water to obtain a second stream of sulfuric acid of an increased concentration by absorption of $SO_3$, and a second gas mixture containing 10 to 30 volume-% $SO_2$ and withdrawing the second stream of sulfuric acid of increased concentration from the second absorption stage; and (f) withdrawing the second gas mixture containing 10 to 30 volume-% $SO_2$ from the second absorber, heating the second gas mixture to a temperature of 380 to 600° C., and subsequently catalytically oxidizing the $SO_2$ with a catalyst whose active component comprises at least 5 weight-% vanadium at a temperature of 480 to 770° C. to form more $SO_3$, which is, optionally, processed to obtain additional sulfuric acid.

11. The process defined in claim 10 wherein according to step (a) the preheated gas containing $SO_2$ and $O_2$ has an $SO_2$ content of 20 to 50 volume-%.

12. The process defined in claim 10 wherein according to step (b) the iron-containing active component at least 80 weight-% iron oxides.

13. The process defined in claim 10 wherein according to step (b) the porous carrier consists of 90 to 100 weight-% zeolite.

14. The process defined in claim 10 wherein according to step (b) the porous carrier consists of 90 to 100 weight-% mesoporous silica.

15. The process defined in claim 10 wherein according to step (b) the gas containing $SO_2$ and $O_2$ is passed at a temperature of 600 to 700° C. through at least two precontact catalyst beds where the gas is cooled between the beds to a temperature of not more than 550° C.

16. The process defined in claim 10 wherein according to step (b) the precontact catalyst is provided with a layer of a vanadium oxidation catalyst gatifs gas inlet side, as an ignition layer to increase the temperature of the gas sufficiently to immediately start the oxidation of the $SO_2$.

17. The process defined in claim 10 wherein according to step (e) the second gas mixture contains not more than 13 volume-% $SO_2$.

18. The process defined in claim 10 wherein according to step (e) the second gas mixture contains about 14.3 volume-% $SO_2$.

19. The process defined in claim 10 wherein according to step (a) the precontact catalyst is selected from the group consisting of iron oxide on mesoporous silica having a weight ratio of Si:Fe of 5:1, iron vanadate on silica having a weight ratio of Si:Fe:V of 33:1:1.3, and iron silicate on zeolite having a weight ratio of H:Si:Fe:O:F of 104:60:4.3:178:0.4.

* * * * *